(12) United States Patent
Ninomiya

(10) Patent No.: US 6,792,822 B2
(45) Date of Patent: *Sep. 21, 2004

(54) BALL GROOVE PROFILE OF BALL SCREW

(75) Inventor: Mizuho Ninomiya, Gunma (JP)

(73) Assignee: NSK Ltd,, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/856,691

(22) Filed: May 15, 1997

(65) Prior Publication Data

US 2003/0106385 A1 Jun. 12, 2003

Related U.S. Application Data

(63) Continuation of application No. 08/352,626, filed on Dec. 9, 1994, now abandoned.

(30) Foreign Application Priority Data

Dec. 10, 1993 (JP) ............................................. 5-310859

(51) Int. Cl.[7] .................................................. F16H 1/18
(52) U.S. Cl. .................................. 74/424.82; 384/516
(58) Field of Search ........................... 74/89.43, 424.81, 74/424.82; 384/516

(56) References Cited

U.S. PATENT DOCUMENTS

| | | | |
|---|---|---|---|
| 3,161,073 A | * 12/1964 | Deutsch et al. | ................ 74/459 |
| 4,177,690 A | 12/1979 | Klinkenberg | .......... 74/424.8 R |
| 4,597,305 A | * 7/1986 | Brusasco | ................ 74/424.8 R |
| 4,821,592 A | * 4/1989 | Rousselot | ............ 74/484.8 NA |
| 5,273,365 A | * 12/1993 | Kondoh | ........................ 384/44 |
| 5,749,266 A | * 5/1998 | Tsukada | ........................ 384/13 |

FOREIGN PATENT DOCUMENTS

| | | | |
|---|---|---|---|
| DE | 4131486 | 3/1993 | |
| JP | 31-8068 | 4/1954 | |
| JP | 48-18979 | 6/1973 | ........... F16H/25/22 |
| JP | 50-6963 | 1/1975 | |
| JP | 57-149620 | * 9/1982 | |
| JP | 62-228746 | 10/1987 | |
| JP | 1-96561 | 6/1989 | |
| JP | 4-8951 | 1/1992 | ........... F16H/25/22 |
| JP | 4-203550 | 7/1992 | ........... F16H/25/22 |

OTHER PUBLICATIONS

Machines & Tooling, in: Production Engineering Research Association of Great Britain, Melton Mowbray, Leicestershire, England, vol. XXXIV, No. 4, 1963, pp. 3–8.

* cited by examiner

Primary Examiner—David Fenstermacher
(74) Attorney, Agent, or Firm—Sughrue Mion, PLLC

(57) ABSTRACT

In a ball groove profile of a ball screw, an outer diameter portion of a screw shaft of the ball screw and a substantially semi-circular ball rolling portion of a ball groove of the ball screw are connected to each other through arcuate portions. The radius of curvature of each arcuate portion ranges from a value half a radius of a rolling ball or more to twice the radius of the ball or less. The arcuate portions are connected at least to the ball rolling portion continuously and smoothly. The ball groove profile can reduce the stress concentration even if impact derived from the collision of the ball is applied to land shoulder portions of the screw shaft, so that the land shoulder portions are not damaged under high-speed operation.

3 Claims, 6 Drawing Sheets

BALL GROOVE PROFILE OF BALL SCREW

This is a Continuation of application Ser. No. 08/352,626 filed Dec. 9, 1994.

BACKGROUND OF THE INVENTION

The present invention relates to an improvement of a ball groove profile of a ball screw and, more particularly, to a ball groove profile of a screw shaft of a ball screw which can improve the durability thereof.

Shown in FIG. 5 is an exemplary ball groove profile of a screw shaft of a conventional ball screw in vertical cross section. This ball groove profile shown in FIG. 5 is an enlargement of a vertical sectional view of a ball groove 1*a* of a screw shaft 1 in a so-called tube type ball screw shown in FIG. 6 in which ball circulation tubes 3 are arranged in a nut 2 with which the screw shaft 1 is engaged through a plurality of balls. The ball groove 1a spirally formed on the screw shaft 1 is such that a land portion 4, which is a cylindrical outer diameter portion of the screw shaft, and an arcuate ball rolling portion 5 whose radius is r are connected through chamfered portions 6 (land shoulder portions), which are linearly inclined surfaces.

A preload is generally applied to the ball screw to improve rigidity against a load applied thereto in the axial direction and insure positional accuracy thereof. For example, a device for applying a preload such as shown in FIG. 7 (U.S. Pat. No. 4,177,690) is available. In this example, the lead of a ball groove 2*a* of the nut 2 is slightly shifted with respect to the ball groove 1*a* of the screw shaft 1. After a ball 7 rolls within the thus shifted grooves 1*a*, 2*a*, the ball 7 moves into the ball circulation tube 3 after being scooped by a scooping end portion 3*a* of the ball circulation tube 3, so that the ball 7 returns to grooves 1*a*, 2*a*. According to this conventional example, stoppage of the ball 7 at the scooping end portion 3*a* of the ball circulation tube is prevented by the chamfered portions 6 which help the ball 7 preloaded within both grooves 1*a*, 2*a* move upward while releasing the ball 7 slightly in the axial direction, and catching of the ball at the time the ball returns into both grooves 1*a*, 2*a* from the ball circulation tube 3 is prevented by the chamfered portions 6. In this conventional example, it is preferable to linearly chamfer the corners with an angle α shown in FIG. 5 ranging from 30 to 60°; it is ideal to linearly chamfer the corners with the angle α ranging from 45 to 50°. As a result of such profile, a point of intersection P1 between each chamfered portion 6 of the ball groove 1*a* of the screw shaft and the arcuate ball rolling portion 5 is formed like a projection.

An arcuately chamfered portion 8 shown in FIG. 8 is also known instead of the linearly chamfered portion 6. The arcuately chamfered portion 8 is mainly employed for a so-called piece circulation type ball screw having such circulation pieces 9 as shown in FIG. 9. This example is characterized as connecting the cylindrical outer diameter portion (land portion) 4 of the screw shaft 1 and the semi-circular ball rolling portion 5 whose radius is r through the arcuately chamfered portions 8 whose radius of curvature is R. To connect both portions 4, 5 and the chamfered portions 8 so as to be substantially continuous, the radius of curvature R of each arcuately chamfered portion is set to a value 40% the radius r of the ball 7 or less. Further, the point of intersection P1 between each arcuately chamfered portion 8 of the ball groove 1*a* of the screw shaft and the arcuate ball rolling portion 5 is still formed like a projection, although the angle of the projection is more obtuse than that shown in FIG. 5.

It should be noted that each of $Y_1/2$ of FIG. 5 and $Y_2/2$ of FIG. 8 denotes half the difference between the outer diameter of the screw shaft 1 and the diameter of the central circle of the ball 7 passing through the center O of the ball 7 within the ball groove 1*a*. In the cases of these conventional ball groove profiles, both $Y_1$ and $Y_2$ are set to comparatively large values, such as 10% of the diameter of the ball 7 or more.

It should also be noted that θ denotes an angle indicating either the position of the point of intersection P1 between the ball rolling portion 5 and each linearly chamfered portion 6 or the position of the point of intersection P1 between the ball rolling portion 5 and each arcuately chamfered portion 8. The angle θ is generally set to a value ranging from 65 to 70°.

When the ball screw is operated, the ball 7 rolls within a spiral load ball rolling passage formed of the ball groove 1*a* of the screw shaft and the ball groove 2*a* of the nut confronting the ball groove 1*a*, riding over the load ball rolling passage and is scooped by a ball circulation section such as the ball circulation tube 3 or the circulation piece 9, and sent into the load ball rolling passage again. This circulation process of the ball is repeated. The tracks of balls circulating in the ball screw are dispersed within a certain range. Machining/fabrication errors, operating speeds, and other operating conditions of the ball screw are responsible for the dispersion in track, which is therefore inevitable.

Because of the dispersion in the track of the ball circulation, it often happens that the ball 7 within the ball circulation section first collides with an area proximate the point P1 of FIG. 5 or FIG. 8 and then is sent into the load ball rolling passage.

However, in the conventional ball groove profiles of the screw shaft of the ball screw such as shown in FIGS. 5 and 8, the point P1 is projecting (the radius of curvature is small although the chamfered portion 8 is arcuate in the case of FIG. 8), which makes stress caused by the ball 7 colliding with an area near such a point large. Particularly, recent ball screws are subjected to large impact stresses due to high-speed operation, which damages the vicinity of the point P1, which is the land shoulder portion of the screw shaft of the ball screw. This shortens the life of a ball screw.

SUMMARY OF THE INVENTION

The present invention has been made in view of the problem noted above. Accordingly, the object of the present invention is to provide a ball screw capable of fulfilling the needs of an extended life under high-speed operation by improving the ball groove profile of the screw shaft of the ball screw.

To achieve the above object, the present invention is applied to a ball groove profile of a ball screw in which, in a vertical section, an outer diameter portion of the screw shaft and a substantially semi-circular ball rolling portion of the ball groove are connected to each other through arcuate portions and a radius of curvature of each arcuate portion ranges from a value between half a radius of a ball rolling in the ball groove or more to twice the radius of the ball or less, at least each arcuate portion being continuously and smoothly connected to the ball rolling portion.

Here, the outer diameter of the screw shaft may be almost equal to or slightly smaller than a diameter of a central circle of the ball fitted with the ball groove arranged on the outer diameter of the screw shaft; and a difference between the outer diameter of the screw shaft and the diameter of the central circle of the ball ranges from 10% of the diameter of the ball or less.

The land shoulder portions of the shaft of the ball screw are made arcuate and the radius of curvature of such arcuately formed land shoulder portion is set to a value as large as half to twice the radius of the ball to allow the land shoulder portions to be connected continuously and smoothly to the arcuate surface of the ball rolling portion. As a result of this profile, there is no projection as at the point P1 in the conventional examples. Accordingly, the stress concentration is reduced even if impact derived from the collision of the ball is applied to the land shoulder portions, so that the land shoulder portions are not damaged under high-speed operation.

In addition, the outer diameter of the screw shaft is set to a value almost equal to or slightly smaller than the diameter of the central circle of the ball fitted with the ball groove arranged on the outer diameter of the screw shaft, and the difference between the outer diameter of the screw shaft and the diameter of the central circle of the ball is set to 10% of the diameter of the ball or less. As a result of this profile, the collision of the ball with the point of intersection P2 between the arcuate portion and the land portion can be prevented even if the radius of curvature of the arcuate portion is increased.

DETAILED DESCRIPTION OF THE PREFERRED EMBODIMENT

An embodiment of the present invention will now be described with reference to the accompanying drawings.

This embodiment of the present invention is applied to a tube type ball screw, which has a screw shaft diameter of 40 mm, a lead of 25 mm, and a ball diameter of 7.1438 mm.

Figure 1:
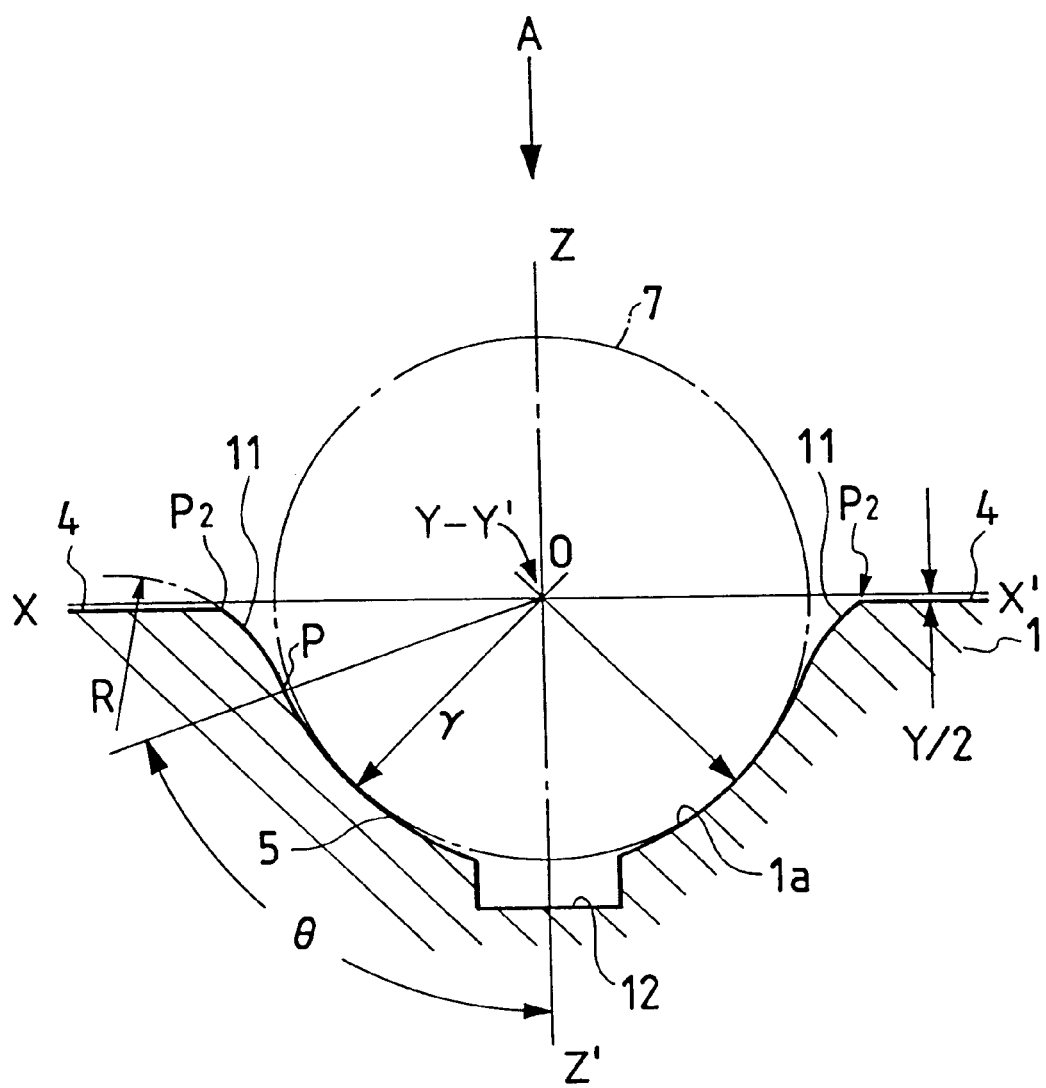
FIG. 1 is a vertically sectional view of a ball groove of a ball screw, which is an embodiment of the present invention.

FIG. 1 shows a ball groove 1a of a screw shaft 1 of the ball screw in vertically sectional form. Arcuately chamfered portions 11 connect an outer diameter portion (land portion) 4 of the screw shaft 1 to a semi-circular ball rolling portion 5 of the ball groove 1a. The radius of curvature of each arcuate portion 11 is almost equal to the radius r of a ball 7, i.e., r=3.57 mm in this embodiment. The arcuate portion 11 is smoothly continuous to a curve of the ball rolling portion 5 at a point P. It should be noted that a release portion 12 for facilitating the grinding operation is formed on the bottom of the ball rolling portion 5.

A point P2, which is a projecting point of intersection connected to the land portion 4 forming the outer diameter of the screw shaft 1, is formed on an upper portion of the arcuate portion 11. Further, a difference Y between the diameter of the central circle of the ball 7 passing through the center O of the ball within the ball groove 1a of the screw shaft 1 and the outer diameter of the screw shaft 1 is set to a value less than 10% of the diameter of the ball 7.

To reduce stress concentration attributable to impact derived from the collision of the ball, it is desirable that the radius of curvature R be maximized. However, the larger radius of curvature R not only makes the point of intersection P2 between the arcuate portion 11 and the land portion 4 closer to the center of the groove, but also makes the projecting profile thereof more acute. When the radius of curvature R exceeds a limit, not only does the likelihood of the ball colliding with the neighborhood of the point P2 increase, but also the stress concentration at the time of the collision increases, which in turn increases damage to the land shoulder portions. To avoid the aforementioned danger, it is necessary to set the upper limit of the radius of curvature R of the arcuate portion 11.

The inventor plotted the positions at which the ball 7 first collides with the surface of the ball groove 1a when the ball 7 is sent toward the ball groove 1a of the screw shaft 1 by passing through the ball circulating tube of the ball screw, and analyzed the obtained diagrams in order to set the upper limit of the radius of curvature R of the arcuate portion 11.

Figure 2:
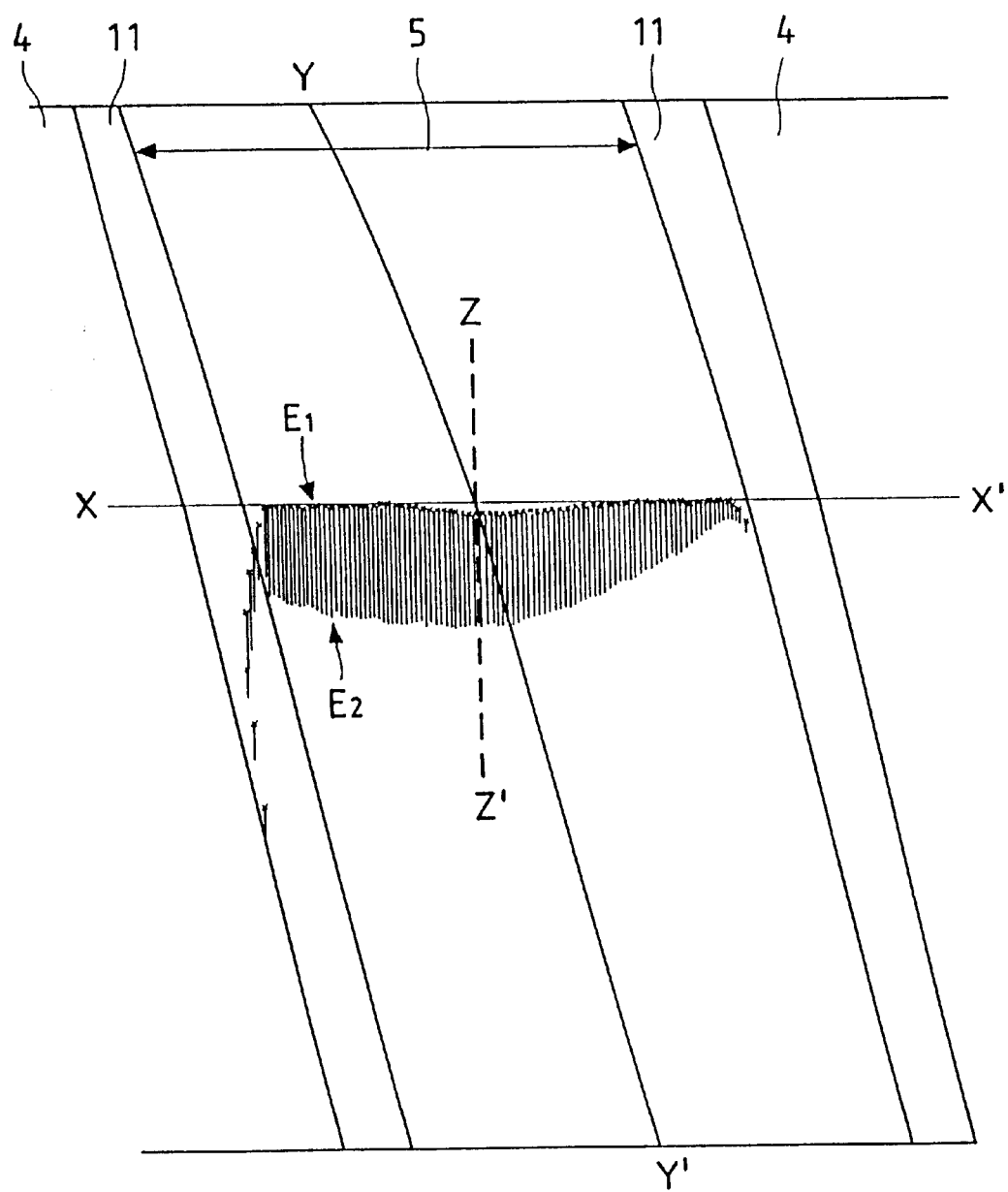
FIG. 2 is a continuous plot of the positions at which ball collides with the ball groove as viewed in a direction indicated by an arrow A, this plot being a track of an ideal ball movement.
Figure 3:
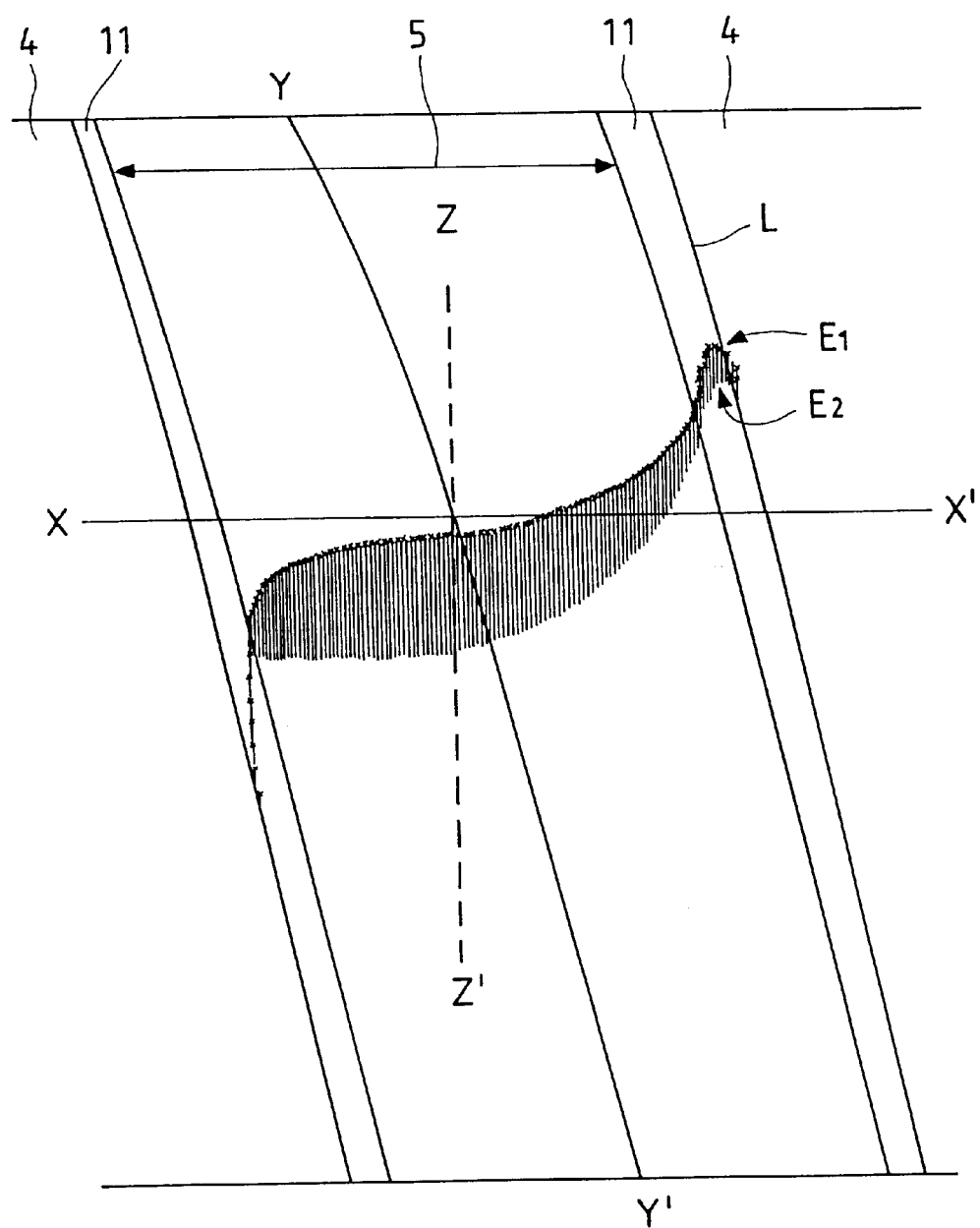
FIG. 3 is a similar continuous plot of the positions at which ball collides with the ball groove, this plot being a track of an actual ball movement.
Figure 4:
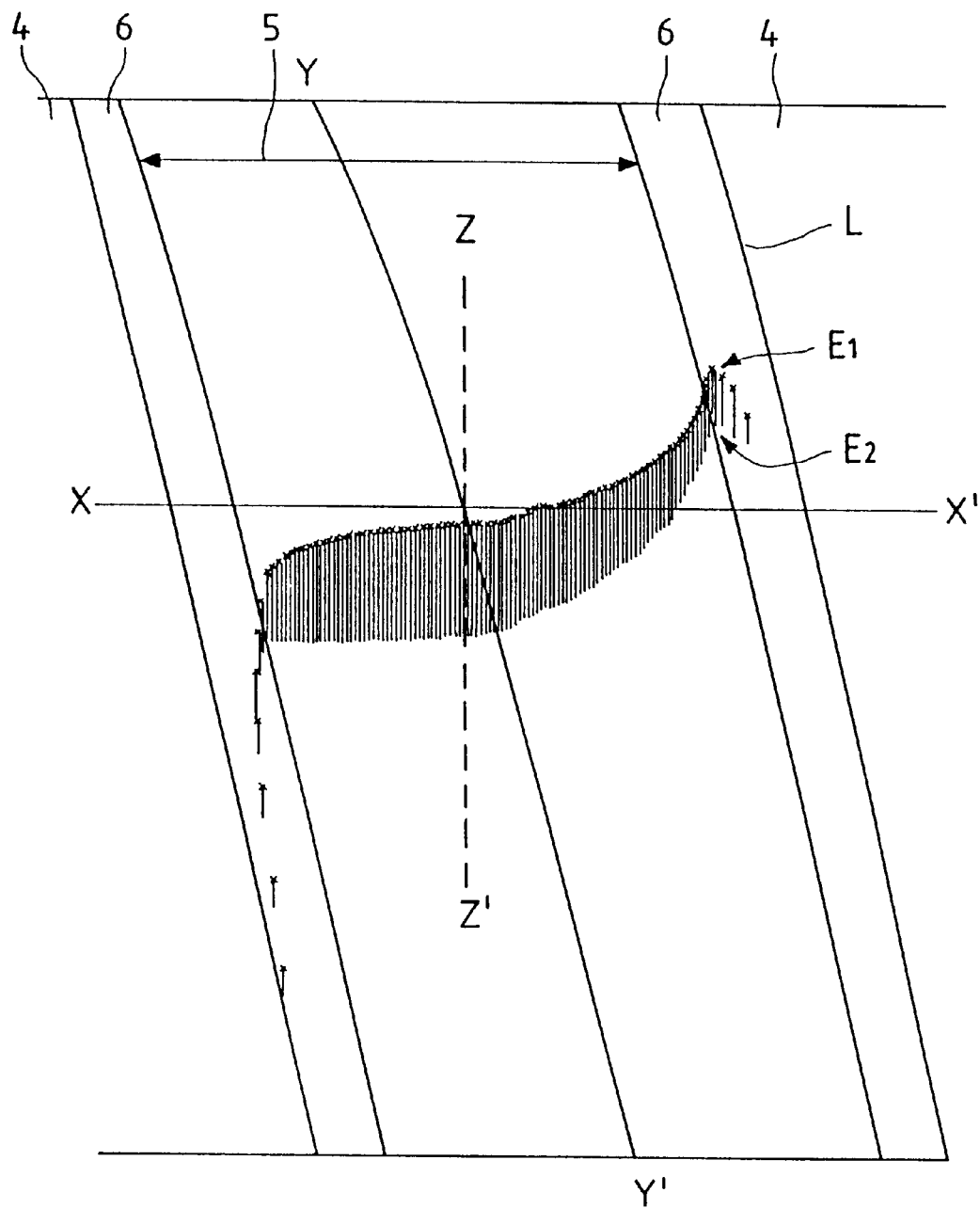
FIG. 4 is a continuous plot of the positions at which ball collides with the ball groove in a conventional ball screw, this plot being a track of an actual ball movement.

FIGS. 2 to 4 are diagrams showing the ball colliding positions that were continuously plotted when viewed down in a direction indicated by an arrow A in FIG. 1. The respective diagrams indicate that the ball collides with the surface of the ball groove 1a at a point $E_2$ that is a point immediately below the highest point $E_1$ when the center of the ball comes to such highest point $E_1$.

FIG. 2 shows an ideal case where a track of the ball being sent into the ball groove 1a is ideal and constant. In this case, the ball collides only with the ball rolling portion 5 independently of the value of the radius of curvature of the arcuate portion 11. Therefore, there is no need to discuss the upper limit of the radius of curvature R of the arcuate portion 11.

However, in actual cases, the track of the ball is inevitably dispersed due to operating conditions such as ball machining/fabrication errors and operating speed differences. FIGS. 3 and 4 show the results of the analyses made in consideration of dispersion in the track of the ball estimated from the dimensional accuracy of the ball screw as well as from the experiments.

FIG. 3 shows a case of the ball groove profile, which is the embodiment shown in FIG. 1. The point $E_2$ at which the ball collides with the surface of the ball groove 1a is within the arcuate portion 11. Since the radius of curvature R of the arcuate portion 11 is almost equal to the radius of the ball, the possibility that damage will be caused from the arcuate portion 11 is extremely small. Further, when the radius of curvature R of the arcuate portion 11 is increased, the ball colliding position comes closer to a projecting boundary L between the arcuate portion 11 and the outer diameter of the screw shaft (land portion) 4. When the radius of curvature R exceeds a predetermined value, the ball collides with the boundary L, thus damaging the land shoulder portion. The inventor made the same analysis on the arcuate portion 11 with various different radii of curvature R, and calculated the upper limit of such a radius of curvature R of the arcuate portion 11 as not to cause the ball to collide with the boundary L between the arcuate portion 11 and the land portion 4. The calculated value was a value two times the radius of the ball or less.

On the other hand, when the radius of curvature R of the arcuate portion 11 was less than a half of the radius of the ball, it was verified that the arcuate portion 11 was damaged by the collision of the ball.

Figure 5:
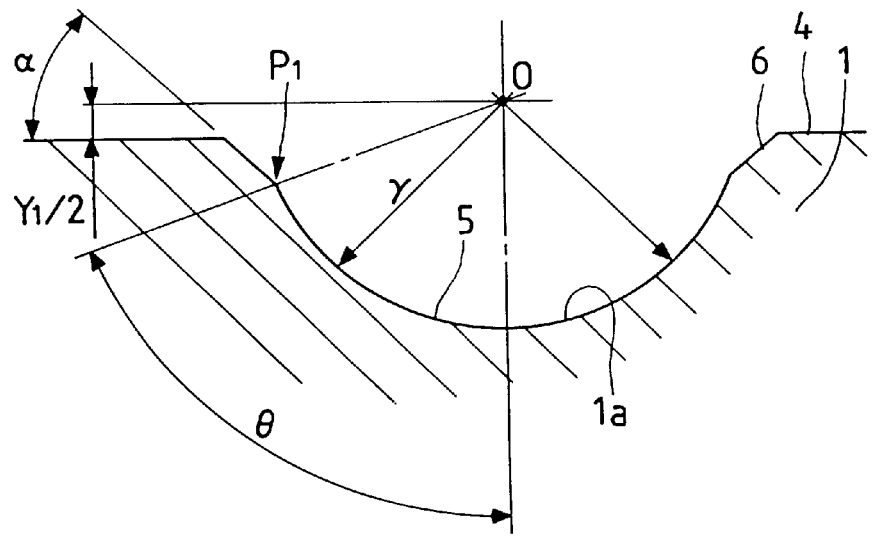
FIG. 5 is a vertically sectional view of a ball groove of the conventional ball screw.
Figure 6:
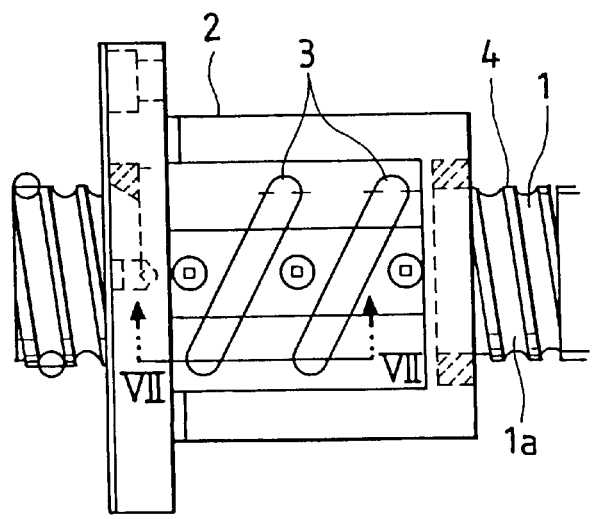
FIG. 6 is a plan view showing an outer profile of a tube type ball groove.
Figure 7:
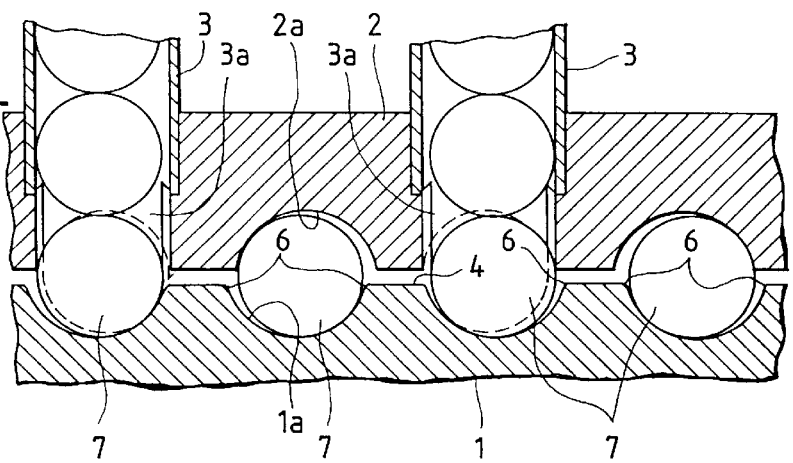
FIG. 7 is a sectional view taken along a line VII—VII of FIG. 6.
Figure 8:
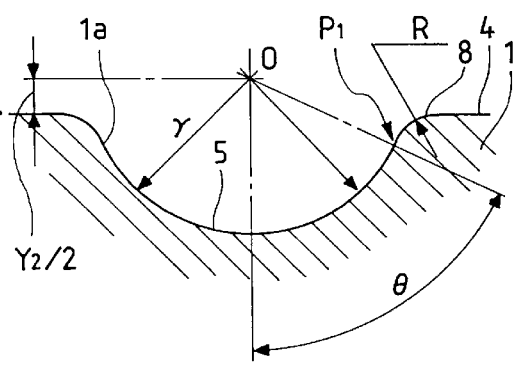
FIG. 8 is a vertical sectional view of a ball groove of another conventional ball screw.
Figure 9:
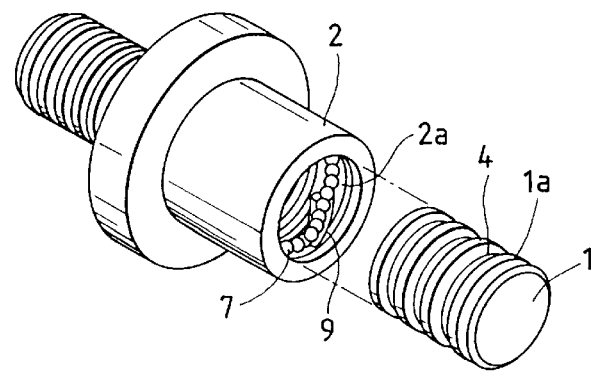
FIG. 9 is a plan view showing an outer profile of a ball groove of a piece circulation type ball screw.

FIG. 4 shows the case of the conventional ball groove profile shown in FIG. 5 (the land shoulder portion 4 is connected to the chamfered portion 6 that is an inclined surface) for reference. In this case, the point $E_2$ at which the ball collides with the ball groove 1a is in the boundary between the ball rolling portion 5 and the chamfered portion 6, and such boundary is projecting. Therefore, it was verified that damage developed from such boundary.

In addition, when the magnitude of Y of the screw shaft 1 (the difference between the diameter of the central circle of the ball and the outer diameter of the screw shaft 1) is decreased to 0 or a value less than 10% of the diameter of the ball; i.e., in the ball groove profile in which the outer diameter of the screw shaft 1 is made relatively large with respect to the diameter of the central circle of the ball, the collision of the ball with the boundary L between the arcuate portion 11 and the land portion 4 can be prevented even if the radius of curvature R of the arcuate portion 11 is made larger. As a result, the stress concentration at the time of collision can be further reduced.

It should be noted that while the case of the tube circulation type ball screw has been described in the aforementioned embodiment, the present invention is similarly applicable to piece circulation type ball screws as well.

As described in the foregoing, the ball groove profile of the ball screw is characterized in that in the vertically sectional profile of the ball groove of the screw shaft of the ball screw, the outer diameter of the screw shaft and the substantially semi-circular ball rolling portion of the ball groove are connected to each other through arcuate portions; the radius of curvature of each arcuate portion ranges from the value between half the radius of the ball rolling in the ball groove or more to twice the radius of the ball or less; and at least each arcuate portions is continuously and smoothly connected to the ball rolling portion. As a result of this profile, the stress concentration is reduced even if impact derived from the collision of the ball is applied to the vicinities of the arcuate portions, thereby preventing the land shoulder portions of the screw shaft from being damaged under high-speed operation. In addition, if the outer diameter of the screw shaft is almost equal to or slightly smaller than the diameter of the central circle of the ball fitted with the ball groove arranged on the outer diameter of the screw shaft; and a difference between the outer diameter of the screw shaft and the diameter of the central circle of the ball is set to 10% of the diameter of the ball or less, the collision of the ball with the point of intersection between each arcuate portion and the land portion can be prevented even if the radius of curvature of the arcuate portion is increased, thereby achieving an increased life of the ball screw.

What is claimed is:

1. A ball screw having a plurality of balls rolling in a ball groove, said ball screw comprising:

a screw shaft having a ball groove formed therein, said screw shaft comprises, in vertical section, an outer diameter portion, an arcuate portion, and a substantially semi-circular ball rolling portion that defines a portion of the ball groove, the ball rolling portion being connected to the outer diameter portion through the arcuate portion, the arcuate portion having a radius of curvature which is a constant value, said constant value being at least half a radius of one of the balls and not greater than twice the radius of the balls, and the arcuate portion being continuously and smoothly connected to the ball rolling portion.

2. The ball screw of claim 1, wherein the screw shaft has an outer diameter in which a difference between the outer diameter and a central circle diameter is within 10% of a diameter of the one of the balls, the central circle diameter being twice a distance from a center axis of the screw shaft to a central circle of one of the balls fitted with the ball groove.

3. The ball screw of claim 1, wherein a groove portion having a U-shaped cross section and extending along with said ball groove is formed on the bottom of said ball groove.

* * * * *